(12) United States Patent
Nonaka

(10) Patent No.: US 8,645,499 B2
(45) Date of Patent: Feb. 4, 2014

(54) IMAGE PROCESSING SYSTEM, IMAGE PROCESSING APPARATUS, IMAGE PROCESSING METHOD AND RECORDING MEDIUM

(75) Inventor: Hideki Nonaka, Hirakata (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 229 days.

(21) Appl. No.: 12/862,371

(22) Filed: Aug. 24, 2010

(65) Prior Publication Data

US 2011/0055356 A1    Mar. 3, 2011

(30) Foreign Application Priority Data

Aug. 25, 2009   (JP) ................. 2009-194873

(51) Int. Cl.
*G06F 15/167* (2006.01)
*H04L 9/08* (2006.01)

(52) U.S. Cl.
USPC .......................................... 709/219; 380/262

(58) Field of Classification Search
USPC .......................................... 709/219; 380/282
See application file for complete search history.

(56) References Cited

U.S. PATENT DOCUMENTS

| | | | |
|---|---|---|---|
| 7,415,707 B2 * | 8/2008 | Taguchi et al. ............... | 717/174 |
| 7,639,820 B2 * | 12/2009 | Saito ............................. | 380/287 |
| 8,031,349 B2 * | 10/2011 | Wang et al. .................. | 358/1.14 |
| 2005/0213597 A1 * | 9/2005 | McNulty ...................... | 370/437 |
| 2005/0273843 A1 | 12/2005 | Shigeeda | |
| 2006/0277598 A1 * | 12/2006 | Ahn .................................. | 726/5 |
| 2010/0290627 A1 * | 11/2010 | Tsuji et al. .................... | 380/282 |
| 2010/0299517 A1 * | 11/2010 | Jukic et al. .................... | 713/150 |

FOREIGN PATENT DOCUMENTS

| | | |
|---|---|---|
| JP | 2005-148876 A | 6/2005 |
| JP | 2006-020291 A | 1/2006 |
| JP | 2008-003782 A | 1/2008 |
| JP | 2008-33403 A | 2/2008 |
| JP | 2008-097075 A | 4/2008 |
| JP | 2009-169759 A | 7/2009 |

\* cited by examiner

*Primary Examiner* — Asghar Bilgrami
(74) *Attorney, Agent, or Firm* — Buchanan Ingersoll & Rooney PC

(57) ABSTRACT

An image processing system includes an image processing apparatus and a decryption server interconnected via a network. When a portable recording medium having an encrypted target file and access information to access a decryption server that decrypts this encrypted target file, recorded therein, is connected to a connector of an image processing apparatus, the image processing apparatus reads out the encrypted target file and the access information from the portable recording medium connected thereto, accesses the decryption server according to the access information, then transmits the encrypted target file to the decryption server. The decryption server decrypts the encrypted target file received therefrom, and returns it to the image processing apparatus. The image processing apparatus executes processing on the decrypted target file that is returned therefrom.

12 Claims, 10 Drawing Sheets

| 3001 | 3002 |
| --- | --- |
| USB Memory Manufacturer | Address of Decryption Server |
| Company A | 11.222.333.444 |
| Company B | 55.666.777.888 |

IPAddress="12.345.678.999"

FIG.10

IMAGE PROCESSING SYSTEM, IMAGE PROCESSING APPARATUS, IMAGE PROCESSING METHOD AND RECORDING MEDIUM

This application claims priority under 35 U.S.C. §119 to Japanese Patent Application No. 2009-194873 filed on Aug. 25, 2009, the entire disclosure of which is incorporated herein by reference in its entirety.

BACKGROUND OF THE INVENTION

1. Field of the Invention

The present invention relates to an image processing system, in which an image processing apparatus such as an image forming apparatus to which a portable recording medium such as a USB memory or a memory card can be connected, and a server are interconnected; an image processing apparatus preferably employed in this image processing system; an image processing method preferably employed in this image processing system; and a computer readable recording medium having a program to make a computer execute processing.

2. Description of the Related Art

The following description sets forth the inventor's knowledge of related art and problems therein and should not be construed as an admission of knowledge in the prior art.

In recent years, portable recording mediums capable of recording digital data in their selves, for example USB memories, have become widely used. At the same time, more and more outlets such as convenience stores have become to offer self-service of an image processing apparatus for people to use by connecting a USB memory thereto.

Accordingly, now users write a preferable file in a USB memory by operating a personal computer (also referred to as "PC") and go out with the USB memory holding this file, so that they can print this file recorded in the USB memory by operating an image processing apparatus when necessary, while they are out. Thus, it is convenient that users do not have to carry around hardcopies, and also it is desirable in terms of security protection.

Also in recent years, when users write a file into a USB memory, the file is encrypted by an encryption software application that is attached to the USB memory, so as to prevent data leakage in case of loss of the USB memory.

There is a conventional technology having been developed, which is the method for remotely outputting highly-confidential information, wherein: a PC transmits a file encrypted by the PC itself, to a center server; the center server transfers this encrypted file to a print server when a user enters a content code and a password obtained from the center server, by operating a multifunctional digital machine; the user decrypts the encrypted file with this password; and the print server gives an instruction to print this decrypted file, to the multifunctional digital machine (for example, Japanese Unexamined Laid-open Patent Publication No. 2005-148876).

And there is another technology having been proposed, wherein: a user encrypts a file with a key issued by a key server and writes this encrypted file into a portable recording medium, by operating a PC, and if a password and an ID that are entered when the user connects this portable recording medium to a printer then transferred to the key server are authenticated thereby, the encrypted file is decrypted with the key transferred to the printer from the key server and printed thereby (for example, Japanese Unexamined Laid-open Patent Publication No. 2008-033403).

An encryption software application attached to a USB memory and its encryption method depend on the provider (manufacturer or etc.) of the USB memory. Meanwhile, since an image processing apparatus does not have common hardware with a user PC, the image processing apparatus cannot activate on its own, the encryption software application attached to the USB memory.

In other words, if a file recorded in a USB memory is encrypted, a conventional image processing apparatus cannot print the file, which has been a problem. This problem has not been able to be resolved even by applying the Japanese Unexamined Laid-open Patent Publication No. 2005-148876 or No. 2008-033403.

In theory, this problem can be resolved by developing a decryption software application that is a match for any encryption software applications attached to any providers' USB memories, and installing it on the image processing apparatus. However, since it requires enormous memory capacity, manpower for development and etc., it is extremely difficult to accomplish such a configuration practically.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

It is an object of the present invention to provide an image processing system capable of processing an encrypted target file recorded in a portable recording medium without having a configuration to decrypt the encrypted file.

It is another object of the present invention to provide an image processing apparatus capable of processing an encrypted target file recorded in a portable recording medium without having a configuration to decrypt the encrypted file.

It is yet another object of the present invention to provide an image processing method implemented by the image processing system.

It is still yet another object of the present invention to provide a computer readable recording medium having an image processing program recorded therein to make a computer execute processing.

According to a first aspect of the present invention, an image processing system in which an image processing apparatus and a decryption server are interconnected via a network, wherein:

the image processing apparatus comprises:
  a connector that removably connects to a portable recording medium having a target file encrypted by an encryption software application and access information to access a decryption server that decrypts this encrypted target file, recorded therein;
  a reader that reads out the encrypted target file and the access information from the portable recording medium connected to the connector;
  an accessor that accesses the decryption server according to the access information obtained by the reader;
  a transmitter that transmits the encrypted target file to the decryption server accessed by the accessor;

a receiver that receives the decrypted target file that is returned from the decryption server; and a file processor that processes the decrypted target file received by the receiver, and the decryption server comprises:

a receiver that receives the encrypted target file from the image processing apparatus;

a decryption executor that decrypts the encrypted target file received by the receiver; and an answer transmitter that returns the target file decrypted by the decryption executor, to the image processing apparatus.

According to a second aspect of the present invention, an image processing apparatus connected to a decryption server via a network, comprising:

a connector that removably connects to a portable recording medium having a target file encrypted by an encryption software application and access information to access a decryption server that decrypts this encrypted target file, recorded therein;

a reader that reads out the encrypted target file and the access information from the portable recording medium connected to the connector;

an accessor that accesses the decryption server according to the access information obtained by the reader;

a transmitter that transmits the encrypted target file to the decryption server accessed by the accessor;

a receiver that receives the decrypted target file that is returned from the decryption server; and a file processor that processes the decrypted target file received by the receiver.

According to a third aspect of the present invention, an image processing method implemented by an image processing system in which an image processing apparatus and a decryption server are interconnected via a network, comprising:

the image processing apparatus's:

detecting whether or not a portable recording medium having a target file encrypted by an encryption software application and access information to access a decryption server that decrypts the encrypted target file, recorded therein, is connected to a connector that removably connects thereto;

reading out the encrypted target file and the access information from the portable recording medium, if detecting that the portable recording medium is connected to the connector;

accessing the decryption server according to the obtained access information;

transmitting the encrypted target file to the accessed decryption server;

receiving the decrypted target file that is returned from the decryption server; and processing the decrypted target file received therefrom, and the decryption server's:

receiving the encrypted target file from the image processing apparatus;

decrypting the encrypted target file received therefrom; and returning the target file that is decrypted, to the image processing apparatus.

According to a fourth aspect of the present invention, a computer readable recording medium having an image processing program recorded therein to make a computer of an image processing apparatus that is connected to a decryption server via a network, execute:

detecting whether or not a portable recording medium having a target file encrypted by an encryption software application and access information to access a decryption server that decrypts the encrypted target file, recorded therein, is connected to a connector that removably connects thereto;

reading out the encrypted target file and the access information from the portable recording medium, if detecting that the portable recording medium is connected to the connector;

accessing the decryption server according to the obtained access information;

transmitting the encrypted target file to the accessed decryption server;

receiving the decrypted target file that is returned from the decryption server; and processing the decrypted target file received therefrom.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 9 is a view showing the USB memory manufacturers and their decryption servers' addresses, with their connection;

FIG. 10 is a view showing the address of a decryption server capable of decrypting the encrypted file recorded in the USB memory;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, one embodiment of the present invention will be described with reference to Figures.

Figure 1:
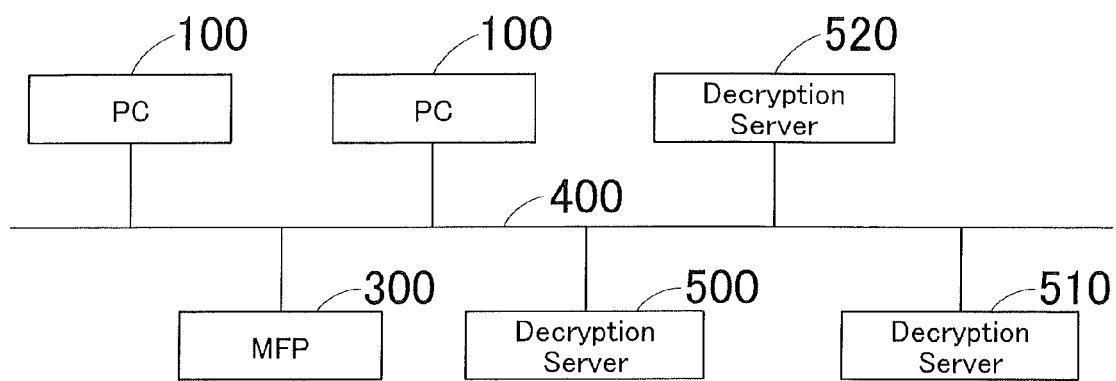
FIG. 1 is a view schematically showing a configuration of an image processing system according to one embodiment of the present invention.

FIG. 1 is a view showing a configuration of an image processing system according to one embodiment of the present invention. This image processing system includes a PC 100 as a user terminal, an image processing apparatus 300, decryption servers (also to be referred to simply as "server") 500, 510 and 520 as a plurality of Web servers (here, three Web servers are employed for example), and the PC 100, the image processing apparatus 300 and the servers 500, 510 and 520 are interconnected via a network 400.

In this example, the encrypted file that the PC 100 transmits to the image processing apparatus 300 is a print file, and the processing that the image processing apparatus 300 executes on the print file is printing. However, the file type and the processing that the image processing apparatus 300 executes on the file are not limited thereto. Accordingly, the encrypted file may be a file to be transferred to another PC, and the processing that the image processing apparatus 300 may be transmission.

Figure 2:
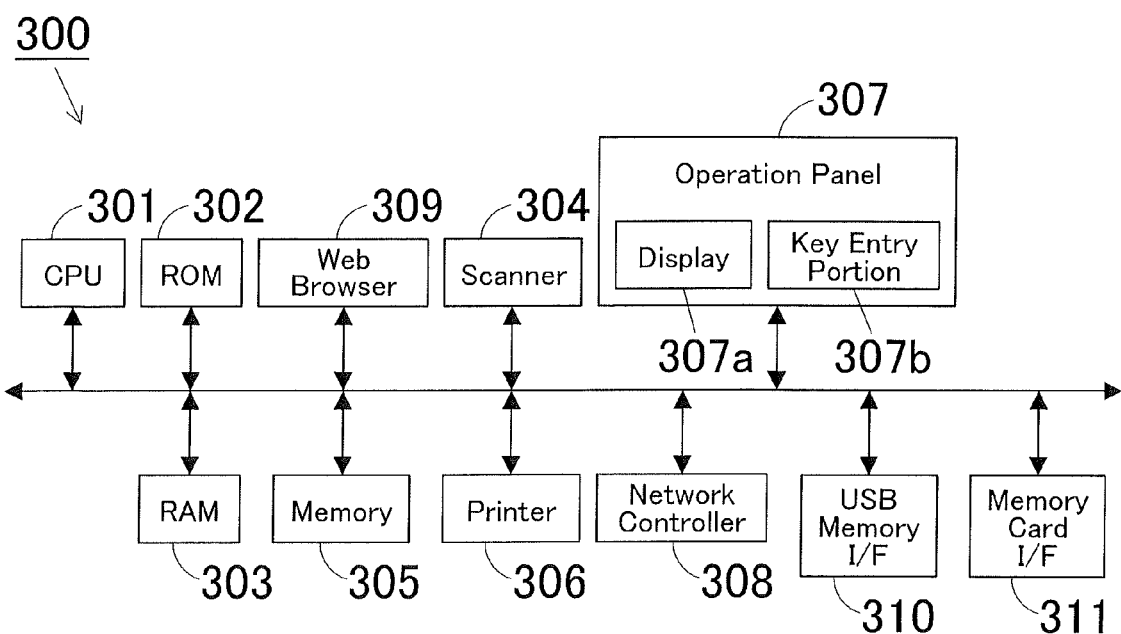
FIG. 2 is a block diagram showing a configuration of an image processing apparatus employed in the image processing system of FIG. 1.

FIG. 2 is a block diagram schematically showing a configuration of the image processing apparatus 300. In this embodiment, a MFP (Multi Function Peripheral) that is a multifunctional digital machine collectively having a plurality of functions, such as the copy function, the print function, the scan function and the facsimile function, is employed as the image processing apparatus 300. Hereinafter, the image processing apparatus also will be referred to as "MFP".

The MFP 300 includes a CPU 301, a ROM 302, a RAM 303, a scanner 304, a memory 305, a printer 306, an operation panel 307, a network controller 308, a Web browser 309, a USB memory interface (USB memory I/F) 310, a memory card interface (memory card I/F) 311 and others.

The CPU 301 centrally controls the entire MFP 300, by enabling the basic functions such as the copy function, the print function, the scan function and the facsimile functions. Furthermore, the CPU 301 detects a USB memory as being connected to the USB memory interface 310, and also a memory card as being connected to the memory card interface 311. And when detects the connection thereof, the CPU 301 reads out from the USB memory or the memory card, a print file that is encrypted (hereinafter, also will be referred to as "encrypted file" or "encrypted print file") and access information to access the decryption server 500, 510 or 520. Accordingly, the CPU 301 accesses the external server and transmits the encrypted file to the external server, then makes the printer 306 print the decrypted print file (hereinafter, also will be referred to as "decrypted file"), returned from the external server 500, 510 or 520. Detailed explanation will be provided later.

The ROM 302 is a memory that records in itself an operation program for the CPU 301 and other data.

The RAM 303 is a memory that provides a work area for the CPU 301 to execute processing according to an operation program.

The scanner 304 is a reader that reads an image of a document placed on a document table (not shown in Figures) and outputs image data.

The memory 305 is a nonvolatile memory device, for example a hard disk drive (HDD). The memory 305 records in itself, image data read out from a document by the scanner 304, data received from another image forming apparatus or a user terminal, and other data. Furthermore, in this embodiment, the memory 305 records a decryption server address table including USB memory providers (for example, USB memory manufacturers), providers of encryption software applications to encrypt print files (for example, encryption software application manufacturers) and the decryption servers 500, 510 and 520's addresses, with their connections.

The printer 306 prints print files recorded in a USB memory or a memory card and decrypted by the external server 500, 510 and 520, image data read out from a document by the scanner 304, print data directly received from the user PC 100, and other data according to a specified mode.

The operation panel 307 is used for various entry operations and etc. The operation panel 307 includes a display 307a that is a touch-panel liquid crystal display for example, that displays on itself, messages, operation screens and etc., and a key entry portion 307b having numeric keys, a start key, a stop key and other keys.

The network controller 308 serves to exchange files (data) by controlling communication with the decryption servers 500, 510 and 520, other image forming apparatuses and other external devices, which are connected to the network.

The Web browser 309 displays on the display 307a of the operation panel 307, Web page information that is obtained from the decryption servers 500, 510 and 520 by accessing via the network controller 308, by a Web browser that is a Web page browsing software application.

The USB memory interface 310 is a connector that removably connects to a USB memory that is an example of a portable recording medium. The USB memory interface 310 includes a plug to connect to a USB memory, and users removably plug their USB memory into the plug.

The memory card interface 311 is a connector that removably connects to a memory card that is an example of a portable recording medium. The memory card interface 311 includes a plug to connect to a memory card, and users removably plug their memory card into the plug.

Figure 3:
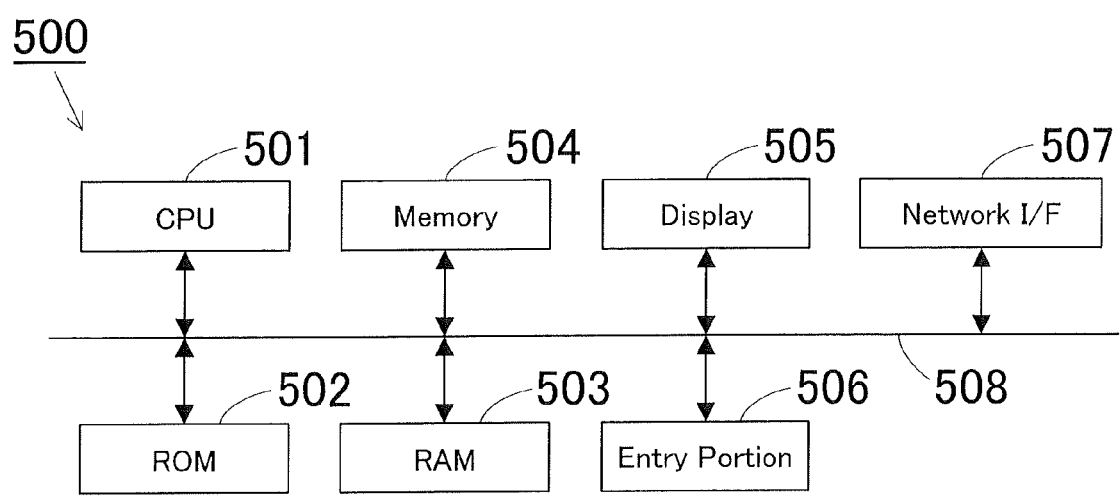
FIG. 3 is a block diagram showing a configuration of a decryption server employed in the image processing system of FIG. 1.

FIG. 3 is a block diagram schematically showing a configuration of the decryption servers 500, 510 and 520. The decryption servers 500, 510 and 520 decrypt an encrypted file recorded in a USB memory or memory card, and are owned and administered by the providers of the USB memory and memory card.

Since the decryption servers 500, 510 and 520 have a common configuration, the decryption server 500 will be described hereinafter, and explanation of the decryption servers 510 and 520 will be omitted.

As shown in FIG. 3, the decryption server 500 includes a CPU 501, a ROM 502, a RAM 503, a memory 504, a display 505, an entry portion 506, a network interface (network I/F) 507 and etc., and these are interconnected via a system bus 508.

The CPU 501 centrally controls the entire server 500, by executing a program recorded in the ROM 502 or the memory 504. Specifically, in this embodiment, the CPU 501 decrypts an encrypted file received from the MFP 300 by an appropriate decryption application program, and returns it to the sender MFP 300.

The ROM 502 is a recording medium that records in itself a program for the CPU 501 to execute processing, and other data.

The RAM 503 is a recording medium that provides a work area for the CPU 501 to execute processing according to an operation program.

The memory 504 is a recording medium such as a hard disk drive, and records in itself, one or more than one decryption application program to decrypt encrypted files received from the MFP 300, other various application programs and other data.

The display 505 is a CRT, a liquid crystal display or etc., and displays on itself, various messages, entry reception screens for administrator or another person, selection screens and etc.

The entry portion 506 is used by users for entry operation, and includes a keyboard, a mouse and etc.

The network interface (network I/F) 507 serves as a communicator that exchanges data with the MFP 300 and other external devices, via the network 400.

The PC 100 accepts USB memories, for example USB memories 200 and 210 of the two providers: Company A and Company B. When a created print file is written into the USB memories 200 and 210, an encryption software application each recorded in the USB memories 200 and 210 also can encrypt the print file.

In these USB memories 200 and 210, manufacturer information (manufacturer names) indicating the providers of the USB memories 200 and 210 and their product information (product names, serial numbers and etc.) are written in advance, respectively. Also, different encryption software applications are recorded therein for these providers.

Also, the PC 100 accepts another portable recording medium, for example a memory card 200 of Company C. The PC 100 can encrypt a created file by an encryption software application of Company X, and writes it into the memory card 220.

The servers 500, 510 and 520 are provided for the USB memory 200, the USB memory 210 and the memory card 220, respectively, and have the function for decrypting encrypted files recorded in the USB memory 200, the USB memory 210 and the memory card 220, respectively. In other words, the server 500 has the decryption function for the USB memory 200 of the Company A, the server 510 has the decryption function for the USB memory 210 of the Company B, and the server 520 has the decryption function that is a match for the encryption software application of the Company X.

Hereinafter, an overview of the procedure executed by the image processing system of FIG. 1 will be described with reference to FIG. 4, from the process of decrypting an encrypted file recorded in the USB memory 200 of the Company A until the process of printing it by the MFP 300.

Figure 4:
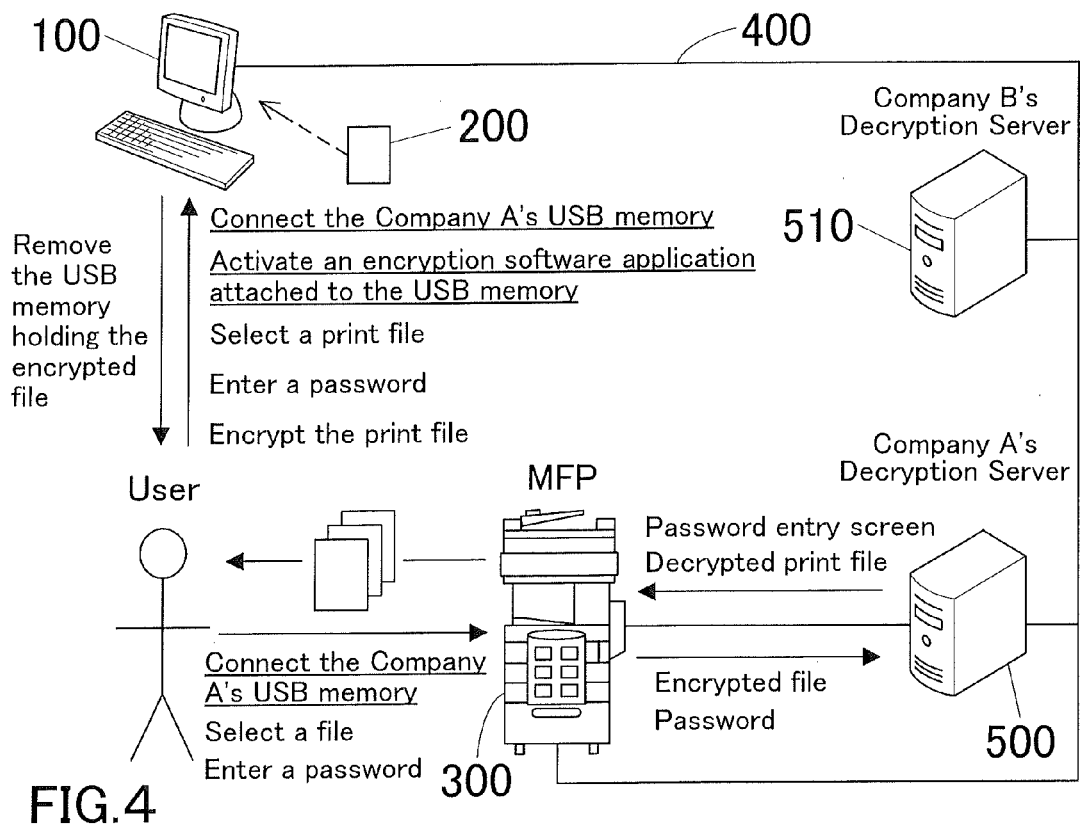
FIG. 4 is a view to explain a method for processing an encrypted file, implemented by the image processing system of FIG. 1.

As shown in FIG. 4, a user connects the USB memory 200 of the Company A to the PC 100 and activates an encryption software application recorded in the USB memory 200, then selects a print file and enters a password. Subsequently, the print file is encrypted by the encryption software application and written into the USB memory 200.

After that, the user removes the USB memory 200 holding the encrypted file and connects it to the MFP 300, then selects a preferable encrypted file and enters a password.

The MFP 300 reads out the selected encrypted file and manufacturer information from the USB memory 200 (manufactured by the Company A), takes reference to an address table (shown in FIG. 9) including providers (manufacturers) and their decryption servers' addresses with their connections, recorded in the memory 305, and then judges the decryption server 500 as being provided for the USB memory 200 of the Company A. In this way, the MFP 300 obtains the server 500's address. Subsequently, MFP 300 transmits the encrypted file and the password to the server 500 and the server 500 decrypts the encrypted file.

The MFP 300 displays a password entry screen, and a user enters the password via the screen. Then, the server 500 returns the decrypted print file and the MFP 300 prints the decrypted print file. As described above, users can securely obtain output of an encrypted print file by operating the MFP 300.

Figure 5:
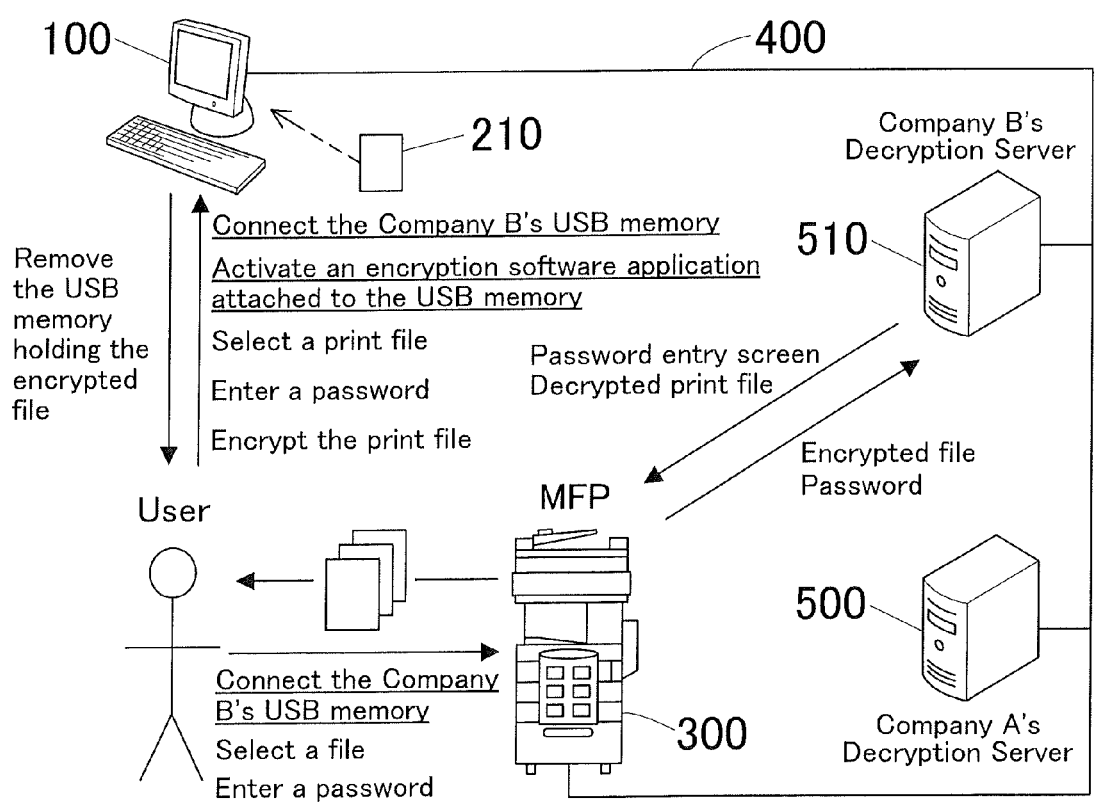
FIG. 5 is another view also to explain a method for processing on encrypted file, implemented by the image processing system of FIG. 1.

In another case shown in FIG. 5, a user connects the USB memory 210 of the Company B to the PC 100 and creates an encrypted file by an encryption software application recorded in the USB memory 210. Subsequently, the MFP 300 selects the address of the server 510 that is provided for the USB memory 210 of the Company B, based on manufacturer information recorded in the USB memory 210 and the address table recorded in the memory 305, and then transmits the encrypted file and a password to the server 510.

Figure 6:
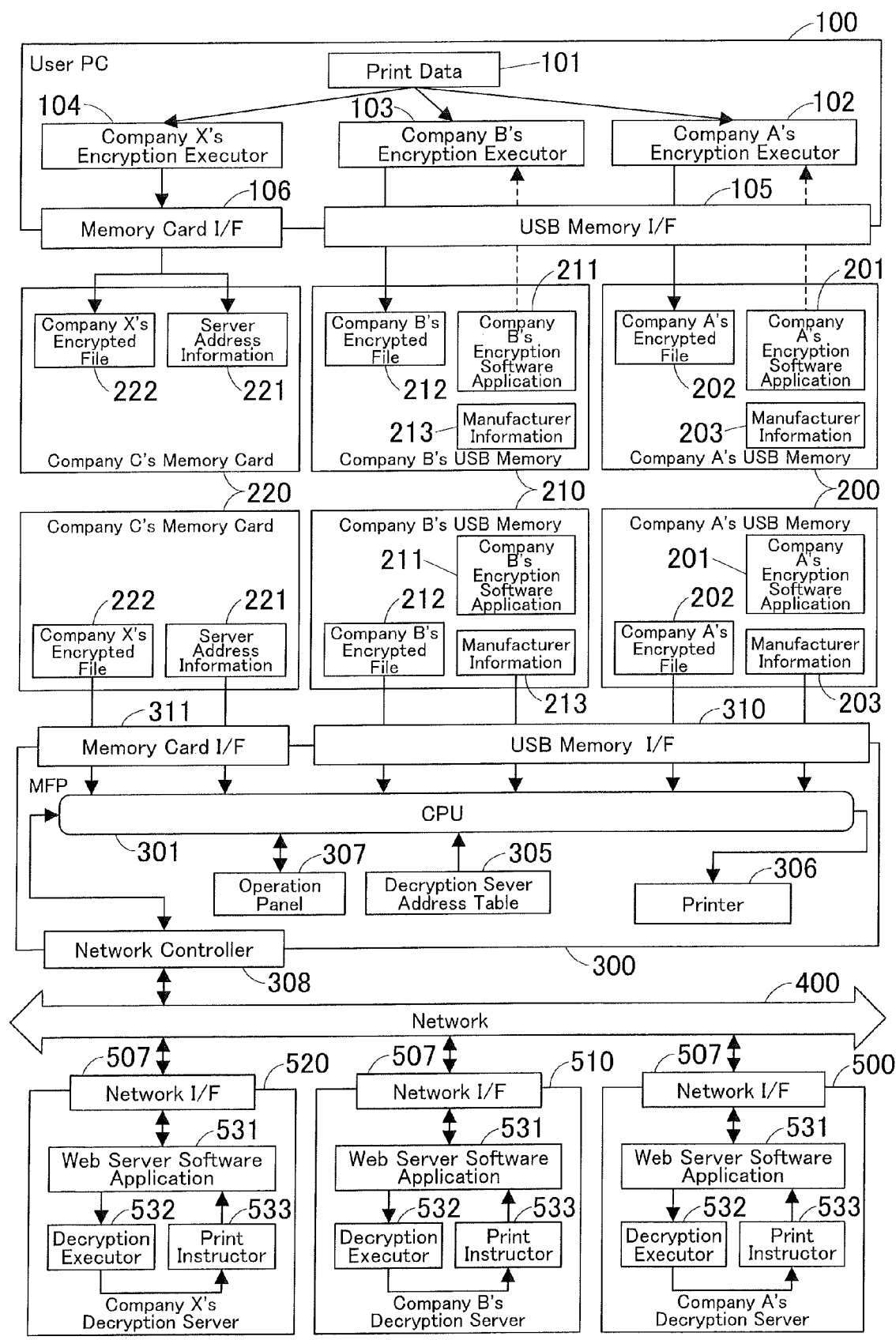
FIG. 6 is yet another view to explain a method for processing an encrypted file, implemented by the image processing system of FIG. 1.

FIG. 6 is a view to detail the procedure described with reference to FIGS. 4 and 5, from the process of decrypting an encrypted file until the process of printing it.

As shown in FIG. 6, the PC 100 employed in the image processing system includes a USB memory interface 105 to which the USB memories 200 and 210 are connected, and a memory card interface 106 to which the memory card 220 is connected.

In the USB memory 200 of the Company A and the USB memory 210 of the Company B, manufacturer information 203, manufacturer information 213, product information, and an encryption software application 210 for the PC 100 and an encryption software application 211 for the PC 100, are recorded in advance. Thus, when the USB memory 200 of the Company A is connected to the PC 100, a print file 202 encrypted by the encryption software application 201 recorded in the USB memory 200 (Company A's encrypted file), can be written therein. Meanwhile, when the USB memory 210 of the Company B is connected to the PC 100, a print file 212 encrypted by the encryption software application 212 recorded in the USB memory 210 (Company B's encrypted file), can be written therein.

The MFP 300 can read out the encrypted files 202 and 212 and the manufacturer information 203 and 213, from the USB memory 200 of the Company A and the USB memory 210 of the Company B, respectively.

On the other hand, manufacturer information is not recorded in the memory card 220. A print file encrypted by an encryption software application of the Company X, recorded in the PC 100, can be written in the memory card 220. At the same time, server address information 221 indicating the address of the decryption server 520 that is capable of decrypting files encrypted by the encryption software application of the Company X (Company X's encrypted file) 222, is written in the memory card 220. The MFP 300 can read out the server address information 221 and the Company X's encrypted file 222, from the memory card 220.

A user connects the USB memory 200 of the Company A to the PC 100, and activates the encryption software application 201 recorded in the USB memory 200. Then, a print file 101 is encrypted by the Company A's encryption executor 102. A password is used as a common key for the encryption. And the encrypted print file is written in the USB memory 200.

Then, the user removes the USB memory 200 from the PC 100 and connects it to the USB memory interface 310 of the MFP 300.

The MFP 300 reads out the encrypted file 202 and the manufacturer information 203 from the USB memory 220; selects the address of the decryption server 500 owned by the Company A, based on the manufacturer information 203 read out therefrom; accesses the decryption server 500 by the network controller 308 via the network 400; and transmits the encrypted file 202 to the decryption server 500.

Here, the decryption server 500 includes a decryption executor 532 that decrypts encrypted files and a print instructor 533 that outputs a print instruction. The CPU 501 implements these functions by executing processing according to Web server software (in FIG. 5, it is referred to as "Web server software application") 531.

The decryption server 500 receives the encrypted file 202 from the MFP 300 via the network interface 507, decrypts the encrypted file 202 received therefrom by the decryption executor 532, then returns it to the MFP 300.

Receiving the decrypted print file, the MFP 300 prints it by the printer 306.

In another case, a user writes in the USB memory 210 of the Company B, a print file 212 encrypted by the Company B's encryption software application 211. Then, the address of the decryption server 510 owned by the Company B is selected based on the manufacturer information 213 recorded in the USB memory 210 of the Company B. And the MFP 300 prints the print file 212, mostly in the same way as explained about the USB memory 200 of the Company A, except that the encrypted file is transmitted to the decryption server 510 and decrypted thereby.

In yet another case, a user writes in the memory card 220 of the Company C, a print file 222 encrypted by the Company X's encryption software application. Then, the server address information 221 indicating the decryption server 520's address is written in the memory card 220, as described above. The server address information 221 may be held by the Company X's encryption software application or etc. When the memory card 220 is connected to the memory card interface 311 of the MFP 300, the MFP 300 reads out the server address information 221 therefrom, and transmits the encrypted file to the address included in the obtained information (the address of the Company X's decryption server 510), and the file is decrypted thereby.

Figure 7:
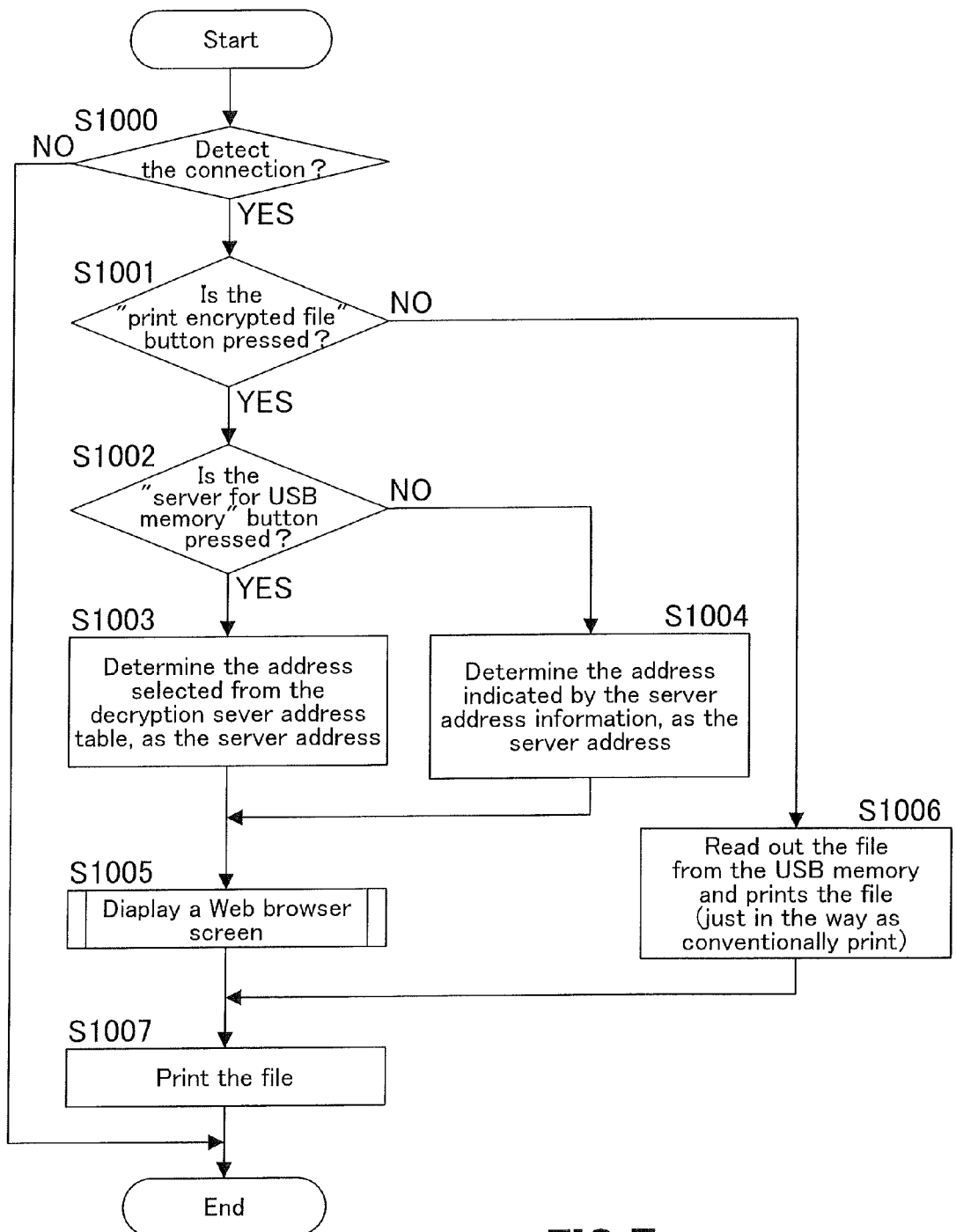
FIG. 7 is a flowchart representing a procedure to process an encrypted file, executed by the image processing apparatus.

FIG. 7 is a flowchart representing a procedure to process an encrypted file, executed by the MFP 300. This procedure is executed by the CPU 301 by executing processing according to an operation program recorded in the ROM 302 or the memory 305.

A user connects the USB memory 200, 210 or the memory card 220 holding an encrypted file, to the USB memory interface 310 or the memory card interface 311 of the MFP 300, and presses a "USB memory print" button in a menu screen displayed on the display 307a of the operation panel 307 of the MFP 300.

Figure 11A:
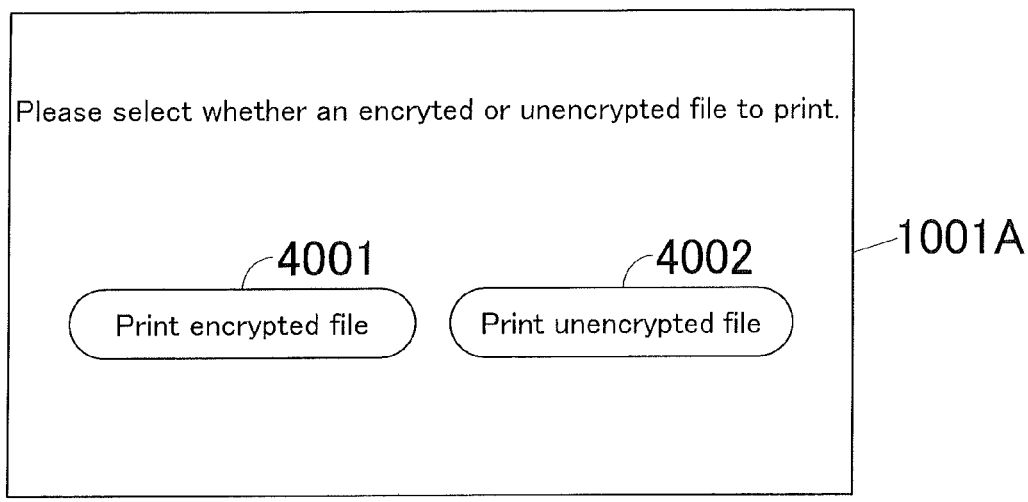
FIG. 11(A) is a view showing a screen to select whether or not to print an encrypted file, displayed on a display of the image processing apparatus.

In Step S1000 of FIG. 7, the connection of the USB memory 200, 210 or the memory card 220 is detected, and as shown in FIG. 11(A), a selection screen 1001A to select whether an encrypted or unencrypted file to print, is displayed on the display 307a. In this selection screen 1001A, as well as a message requesting to select a preferable file, a "print encrypted file" button 4001 and a "print unencrypted file" button 4002 are also displayed.

In Step S1001, it is judged whether or not the "print encrypted file" button 4001 is pressed.

Figure 11B:
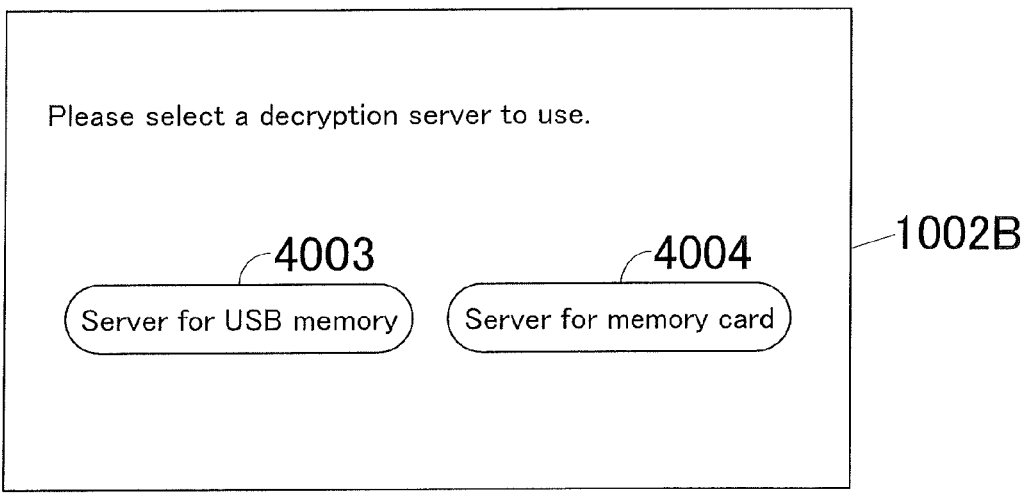
FIG. 11(B) is a view showing a screen to select a decryption server, displayed on a display of the image processing apparatus.

If the user presses the "print encrypted file" button 4001 and it is judged that the "print encrypted file" button is pressed (YES in Step S1001), a decryption server selection screen 1002B is displayed on the display 307a, as shown in FIG. 11(B). In this screen, as well as a message requesting to select a decryption server to use, a "server for USB memory" button 4003 and a "server for memory card" button 4004 are also displayed. The "server for USB memory" button 4003 will be pressed when the USB memory 200 or 210 is used, and the "server for memory card" button 4004 will be pressed when the memory card 220 is used.

Alternatively, instead of allowing the user to select the "server for USB memory" button 4003 or the "server for memory card" button 4004, the MFP 300 may automatically judge whether manufacturer information or server address information, the information read out from the USB memory 200, 210 or the memory card 220 is. Instead of manufacturer information, address information of the decryption servers 500 and 510, may be recorded in the USB memories 200 and 210, respectively.

In Step S1002, it is judged whether or not the "server for USB memory" button 4003 is pressed.

If the user selects "server for USB memory" by pressing the button 4003 (YES in Step S1002), the MFP 300 reads out manufacturer information from the USB memory 200 or 210, and selects the decryption server 500 or 510's address based on the address table (shown in FIG. 9) including manufacturers and decryption servers' addresses with their connections, recorded in the memory 305, and then determines the selected address as the server address. And the routine proceeds to Step S1005.

If the user presses the "server for memory card" button 4004 via the decryption server selection screen 1002B (NO in Step S1002), then in Step S1004, since encrypted files are recorded in the memory card 220, server address information is read out from the memory card 220 and the address indicated thereby is determined as the server address. Then, the routine proceeds to Step S1005.

In Step S1005, a Web browser screen is displayed on the display 307a of the MFP 300 and an access to the server 500, 510 or the 520 is made according to the address determined in Step S1003 or S1004, which is an URL. And the MFP 300 receives the file and other data from and the decryption server 500, 510 or 520, in Step S1006, and prints the decrypted file in Step S1007. And then, the routine terminates.

Meanwhile in Step S1001, if the "print unencrypted file" button 4002 is pressed (NO in Step S1001), an unencrypted file is read out from the USB memory 200, 210 or the memory card 220 in Step S1006, and is printed in Step S1007, just like in the conventional method. Then, the routine terminates.

Figure 8:
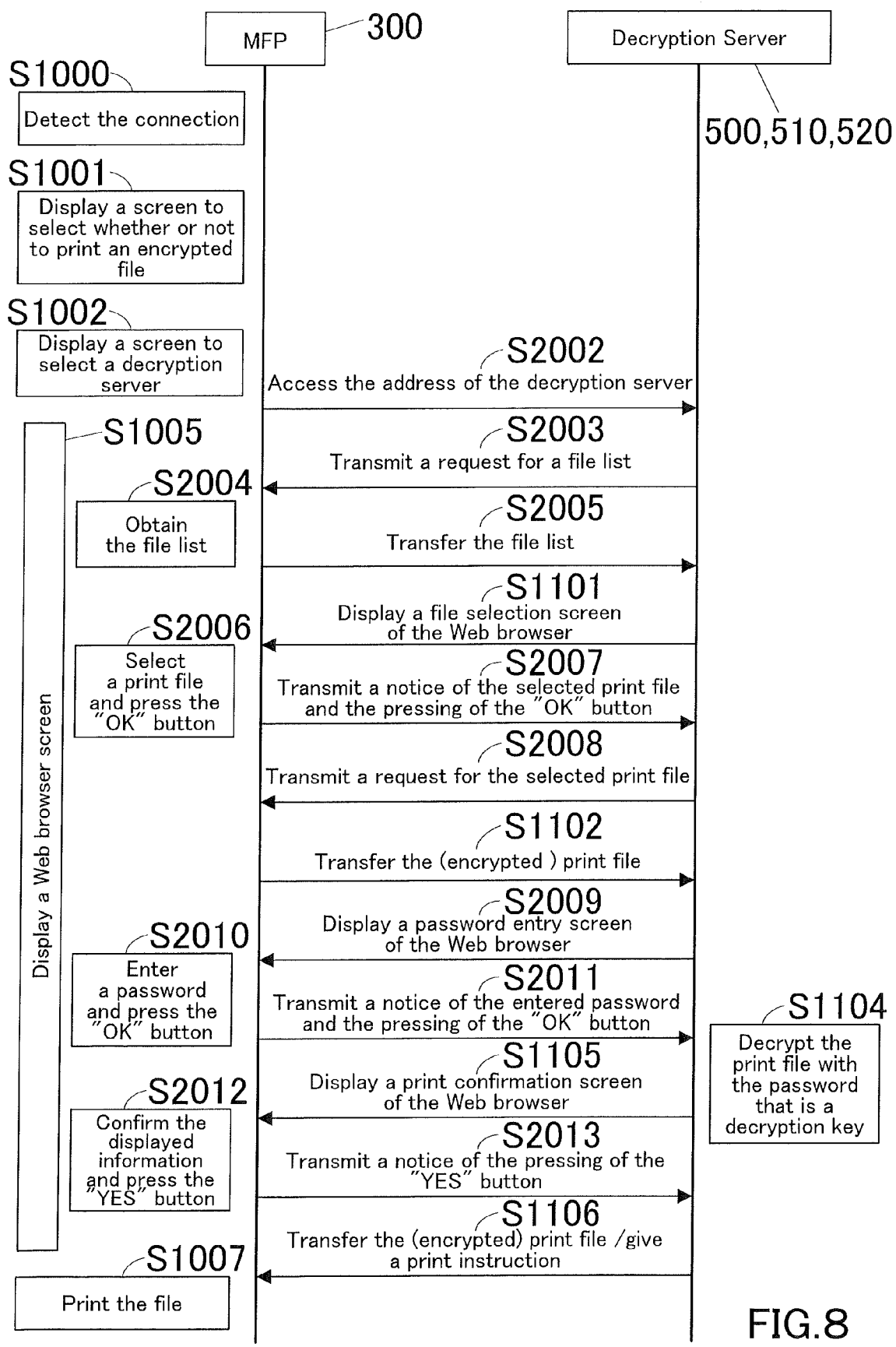
FIG. 8 is a view showing a sequence to exchange data between the image processing apparatus and the decryption server, when an encrypted file is processed.

FIG. 8 is a sequential view showing data exchange between the MFP 300 and the decryption server 500, 510 or 520, when an encrypted file is processed.

In Step S1000, the connection of the USB memory 200, 210 or the memory card 220 is detected. And a selection screen to select whether or not to print an encrypted file is displayed in Step S1001, and if "print encrypted file" is selected, a selection screen to select a decryption server is displayed in Step S1002. When a decryption server is selected and the decryption server's address is determined, the Web browser 309 is activated and a browser screen is displayed on the display 307a, in Step S1005.

In Step S2002, the MFP 300 accesses the decryption server 500, 510 or 520 via Internet or etc. Then in Step S2003, the decryption server 500, 510 or 520 transmits a request for a list of the encrypted files to the MFP 300. The MFP 300 obtains a list of the encrypted files from the USB memory 200, 210 or the memory card 220 in Step S2004, and transfers the obtained list to the decryption server 500, 510 or 520.

The decryption server 500, 510 or 520 converts the received file list into HTML (HyperText Markup Language), and in Step S1101, transmits to the MFP 300, the HTML file list and display data of a file selection screen of the Web browser.

Figure 11C:
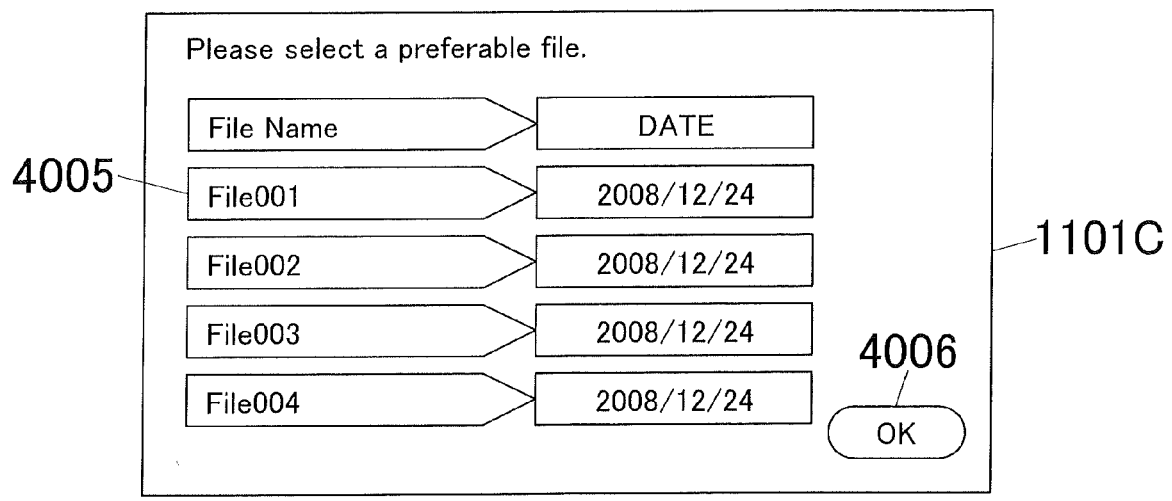
FIG. 11(C) is a view showing a screen to select a file, displayed on a display of the image processing apparatus.

Receiving the HTML file list and the display data of a file selection screen, the MFP 300 displays a file selection screen 1101C on the display 307a as shown in FIG. 11(C).

A user selects a preferable file among the file list displayed in the file selection screen 1101C. For example, in Step S2006, the user selects a file 4005 (file name: File001) shown in FIG. 11(C) and presses an "OK" button 4006 in this screen. Then, the MFP 300 transmits to the decryption server 500, 510 or 520, a notice of the file 4005 and the pressing of the "OK" button 4006.

In Step S2008, the decryption server 500, 510 or 520 transmits a request for the selected file to the MFP 300.

In Step S1102, in response to the request, the MFP 300 transfers the encrypted file recorded in the USB memory 200, 210 or the memory card 220, to the decryption server 500, 510 or 520.

Subsequently in Step S2009, the decryption server 500, 510 or 520 returns to the MFP 300, browser display data of a password entry screen 1103A like that shown in FIG. 12(A) and the MFP 300 displays the password entry screen 1103A on the display 307a.

Figure 12A:
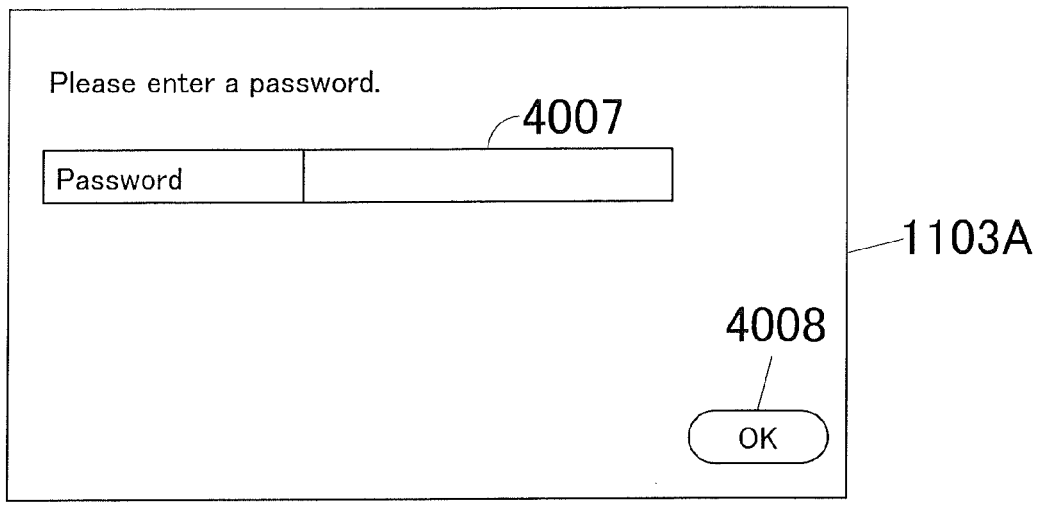
FIG. 12(A) is a view showing a password entry screen displayed on a display of the image processing apparatus.

The user enters a password in a password entry field 4007 of the password entry screen 1103A shown in FIG. 12(A) and presses an "OK" button 4008 in this screen (Step S2010). Then, the MFP 300 transmits to the decryption server 500, 510 or 520, a notice of the password and the pressing of the "OK" button (Step S2011).

Figure 12B:
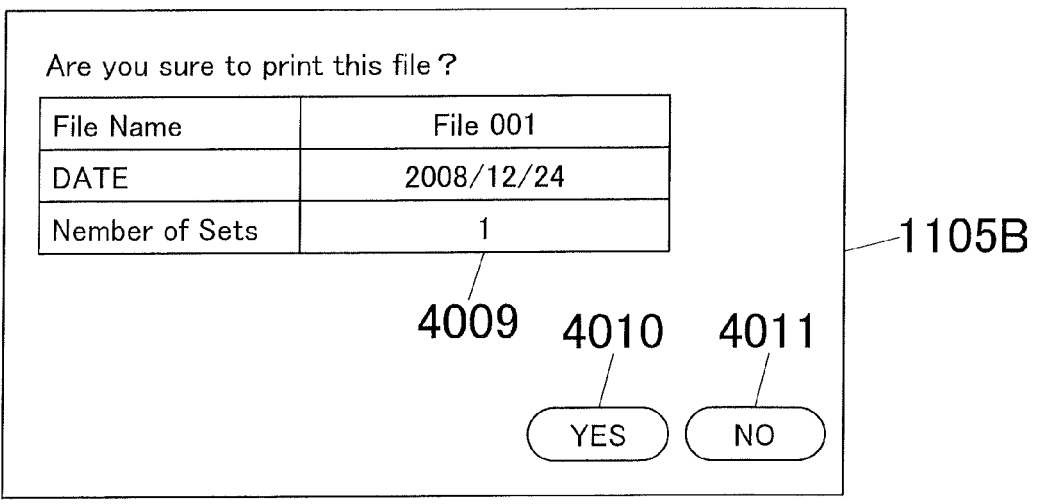
FIG. 12(B) is a view showing a print confirmation screen displayed on a display of the image processing apparatus.

In Step S1104, the decryption server 500, 510 or 520 decrypts the encrypted file with the received password that is the decryption key, by the decryption executor 532, and gives the decrypted file to the print instructor 533. Subsequently in Step S1105, the decryption server 500, 510 or 520 transmits to the MFP 300, browser display data of a print confirmation screen 1105B like that shown in FIG. 12(B) and the MFP 300 displays the print confirmation screen 1105B on the display 307a. In this screen 1105B, as well as a message asking whether printing or not printing, an entry field 4009 to enter a file name, a time and date and a number of sets, a "YES" button 4010 and a "NO" button 4011 are displayed.

The user presses the "YES" button 4010 via the print confirmation screen 1105B in Step S2012. Then, the MFP 300 transmits a notice of the pressing of the "YES" button 4010 to the decryption server 500, 510 or 520, in Step S2013.

In Step S1106, the decryption server 500, 510 or 520 transmits the decrypted target file and a print instruction to the MFP 300, via the print instructor 533, and at the same time, removes this target file therefrom.

In Step S1007, the MFP 300 gives the received target file and a print instruction to the printer 306 to make it print this target file.

As described above, in this embodiment, users can carry around the USB memory 200, 210 or the memory card 220 holding encrypted files, and thus, even if they happen to lose this USB memory or memory card, the confidentiality of the encrypted files can be protected.

Furthermore, an encrypted file is decrypted by the decryption server 500, 510 or 520 that is appropriate. And the MFP 300 can easily obtain the decrypted file from the decrypted server 500, 510 or 520, since the manufacturer information 203, 213 and the server address information 221 to access the decryption servers 500, 510 and 520 are recorded in advance, in the USB memories 200, 210 and the memory card 220, as well as the encrypted files 202, 212 and 222, respectively. Thus, the MFP 300 can print an encrypted file without having a configuration to decrypt the encrypted file, and does not need to change its own configuration even if a new encryption format to encrypt files is provided.

Furthermore, users do not have to enter the address of the decryption server 500, 510 or 520 via the operation panel 307 or etc. of the MFP 300, since the manufacturer information 203, 213 and the server address information 221 to access the decryption servers 500, 510 and 520 are recorded in advance, in the USB memories 200, 210 and the memory card 220, respectively. This would improve usefulness.

Furthermore, the decryption servers 500, 510 and 520 are provided for the respective providers of the USB memories 200, 210 and the encryption software application, in other words, a plurality of decryption servers are provided for respective USB memory providers and encryption software application providers. Thus, the respective providers can maintain their own decryption servers 500, 510 and 520.

While various embodiments of the present invention have been illustrated and described, it will be clear that the present invention is never limited to there embodiments only.

Figure 13:
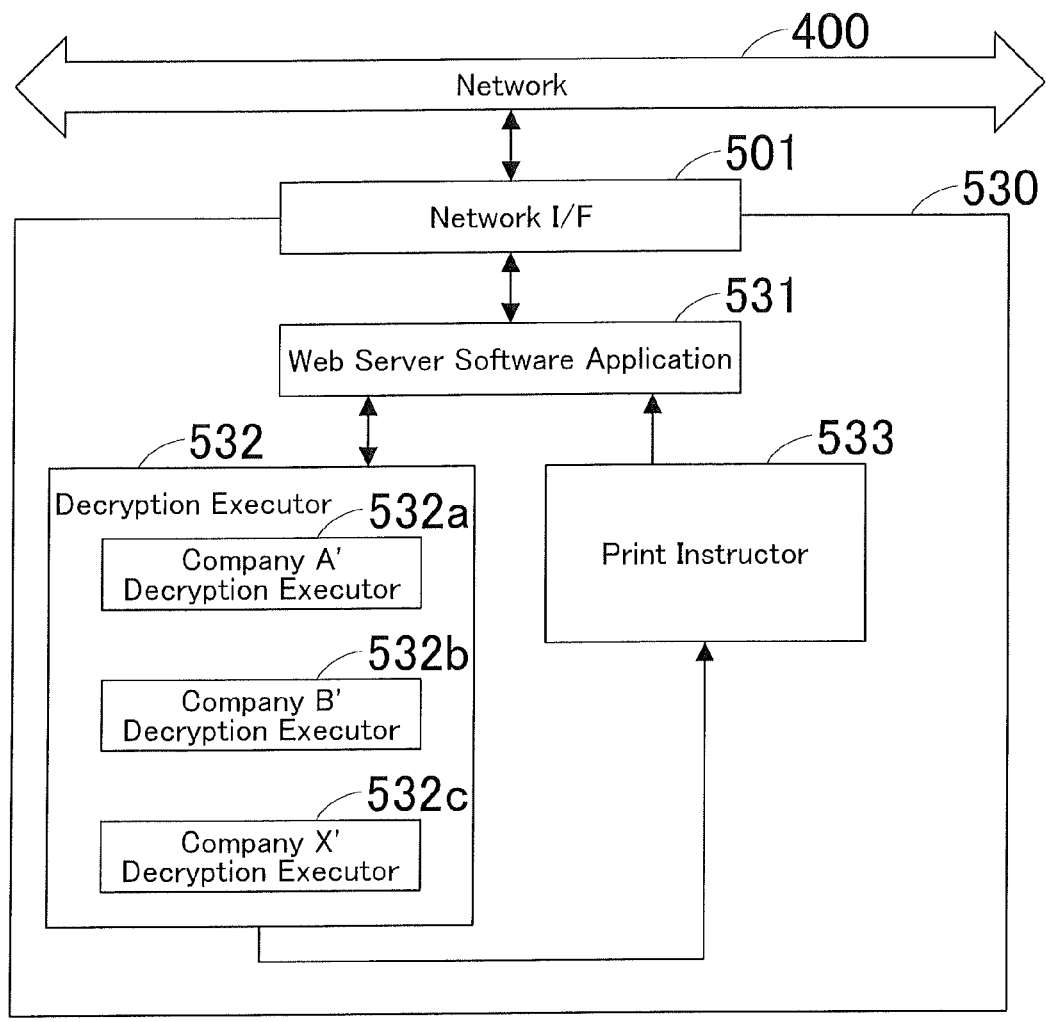
FIG. 13 is a block diagram showing a configuration of a decryption server employed in an image processing system according to another embodiment of the present invention.

For example, the decryption servers 500, 510 and 520 are provided for the respective providers of the USB memories and the encryption software application. However, the functions of these decryption servers may be consolidated in only one server. In such a case, as shown in FIG. 13, a decryption server 530 serves as the decryption executor 532 including the Company A's decryption executor 532a for the Company A's USB memory 200; the Company B's decryption executor 532b for the Company B's USB memory 210; and the Company X's decryption executor 532c for the memory card 220. And the Company A's decryption executor 532a decrypts an encrypted file read out from the Company A's USB memory 200, the Company B's decryption executor 532b decrypts an encrypted file read out from the Company B's USB memory 210, and the Company X's decryption executor 532c decrypts an encrypted file read out from the memory card 220.

Based on the manufacturer information recorded in the USB memory 200 or 210, the decryption server 530 that is a match for the encryption software application is determined. Meanwhile, based on the manufacturer information recorded in the memory card 220, the decryption server 530 that is a match for the encryption software application is determined.

In these embodiments described above, the USB memories 200, 210 and the memory card 220 are employed as portable recording mediums, just for example. Other portable recording mediums may be employed.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image processing system in which an image processing apparatus and a decryption server are interconnected via a network, wherein:
the image processing apparatus comprises:
a connector that removably connects to a portable recording medium storing:
an encryption software application linked to a supplier of the portable recording medium or a supplier of the encryption software application itself;
a target file encrypted by the encryption software application; and
access information to access a decryption server decrypting the target file encrypted by the encryption software application, the decryption server corresponding to the encryption software application;
a reader that reads out the encrypted target file and the access information from the portable recording medium connected to the connector;
an accessor that accesses the decryption server corresponding to the encryption software application, on the basis of the access information obtained by the reader;
a transmitter that transmits the encrypted target file to the decryption server accessed by the accessor;
a receiver that receives the decrypted target file that is returned from the decryption server; and
a file processor that processes the decrypted target file received by the receiver, and the decryption server comprises:
a receiver that receives the encrypted target file from the image processing apparatus;
a decryption executor that decrypts the encrypted target file received by the receiver; and
an answer transmitter that returns the target file decrypted by the decryption executor, to the image processing apparatus.

2. The image processing system recited in claim 1, wherein:
there are a plurality of decryption servers and each of them is provided for a portable recording medium provider or an encryption software application provider; and
the accessor of the image processing apparatus accesses one of the decryption servers provided for a portable recording medium provider or an encryption software application provider, according to the access information.

3. The image processing system recited in claim 1, wherein:
the decryption server is a single server that is capable of decrypting target files encrypted by a plurality of different encryption software applications;
the decryption server further comprises an encryption software identifying portion that identifies the encryption software application having encrypted the file received by the receiver from the image processing apparatus; and
the decryption executor decrypts the target file encrypted by the encryption software application identified by the encryption software identifying portion, in a decryption method that is a match for the encryption software application.

4. An image processing apparatus connected to a decryption server via a network, comprising:
a connector that removably connects to a portable recording medium storing:
an encryption software application linked to a supplier of the portable recording medium or a supplier of the encryption software application itself;
a target file encrypted by the encryption software application; and
access information to access a decryption server decrypting the target file encrypted by the encryption software application, the decryption server corresponding to the encryption software application;
a reader that reads out the encrypted target file and the access information from the portable recording medium connected to the connector;
an accessor that accesses the decryption server corresponding to the encryption software application, on the basis of the access information obtained by the reader;
a transmitter that transmits the encrypted target file to the decryption server accessed by the accessor;
a receiver that receives the decrypted target file that is returned from the decryption server; and
a file processor that processes the decrypted target file received by the receiver.

5. The image processing apparatus recited in claim 4, wherein:
there are a plurality of decryption servers and each of them is provided for a portable recording medium provider or an encryption software application provider; and
the accessor of the image processing apparatus accesses one of the decryption servers provided for a portable recording medium provider or an encryption software application provider, according to the access information.

6. The image processing apparatus recited in claim 4, wherein;

the decryption server is a single server that is capable of decrypting target files encrypted by a plurality of different encryption software applications; and the accessor of the image processing apparatus accesses this decryption server according to the access information.

7. An image processing method implemented by an image processing system in which an image processing apparatus and a decryption server are interconnected via a network, comprising:

the image processing apparatus's:

detecting whether or not a portable recording medium is connected to a connector that removably connects thereto, the portable recording medium storing:

an encryption software application linked to a supplier of the portable recording medium or a supplier of the encryption software application itself;

a target file encrypted by the encryption software application; and access information to access a decryption server decrypting the target file encrypted by the encryption software application, the decryption server corresponding to the encryption software application;

reading out the encrypted target file and the access information from the portable recording medium, if detecting that the portable recording medium is connected to the connector;

accessing the decryption server corresponding to the encryption software application, on the basis of the obtained access information;

transmitting the encrypted target file to the accessed decryption server;

receiving the decrypted target file that is returned from the decryption server; and processing the decrypted target file received therefrom, and the decryption server's:

receiving the encrypted target file from the image processing apparatus;

decrypting the encrypted target file received therefrom; and returning the target file that is decrypted, to the image processing apparatus.

8. The image processing method recited in claim 7, wherein:

the number of the decryption servers is a plural number and each of them is provided for a portable recording medium provider or an encryption software application provider; and the image processing apparatus accesses one of the decryption servers provided for a portable recording medium provider or an encryption software application provider, according to the access information.

9. The image processing method recited in claim 7, wherein:

the decryption server is one server that is capable of decrypting target files encrypted by a plurality of different encryption software applications;

the decryption server further identifies the encryption software application having encrypted the file received by the receiver from the image processing apparatus; and the decryption server decrypts the target file encrypted by the identified encryption software application, in a decryption method that is a match for the encryption software application.

10. A non-transitory computer readable recording medium having an image processing program recorded therein to make a computer of an image processing apparatus that is connected to a decryption server via a network, execute:

detecting whether or not a portable recording medium is connected to a connector that removably connects thereto, the portable recording medium storing:

an encryption software application linked to a supplier of the portable recording medium or a supplier of the encryption software application itself;

a target file encrypted by the encryption software application; and access information to access a decryption server decrypting the target file encrypted by the encryption software application, the decryption server corresponding to the encryption software application;

reading out the encrypted target file and the access information from the portable recording medium, if detecting that the portable recording medium is connected to the connector;

accessing the decryption server corresponding to the encryption software application, on the basis of the obtained access information;

transmitting the encrypted target file to the accessed decryption server;

receiving the decrypted target file that is returned from the decryption server; and processing the decrypted target file received therefrom.

11. The non-transitory computer readable recording medium recited in claim 10, wherein:

there are a plurality of decryption servers and each of them is provided for a portable recording medium provider or an encryption software application provider, and which image processing program makes the computer further execute:

accessing one of the decryption servers provided for a portable recording medium provider or an encryption software application provider, according to the access information.

12. The non-transitory computer readable recording medium recited in claim 10, wherein:

the decryption server is a single server that is capable of decrypting target files encrypted by a plurality of different encryption software applications, and which image processing program makes the computer further execute:

accessing this decryption server according to the access information.

* * * * *